(12) United States Patent
Tashiro et al.

(10) Patent No.: US 12,139,085 B2
(45) Date of Patent: Nov. 12, 2024

(54) FRONT STRUCTURE OF VEHICLE

(71) Applicant: MAZDA MOTOR CORPORATION, Hiroshima (JP)

(72) Inventors: Kuniyoshi Tashiro, Hiroshima (JP); Hiroshi Mizuguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 265 days.

(21) Appl. No.: 17/812,353

(22) Filed: Jul. 13, 2022

(65) Prior Publication Data

US 2023/0105286 A1 Apr. 6, 2023

(30) Foreign Application Priority Data

Oct. 1, 2021 (JP) ................................ 2021-162534

(51) Int. Cl.
*B60R 19/34* (2006.01)
*B60R 19/52* (2006.01)
*B62D 21/15* (2006.01)
*B62D 25/08* (2006.01)

(52) U.S. Cl.
CPC .............. *B60R 19/34* (2013.01); *B62D 21/15* (2013.01); *B60R 2019/525* (2013.01); *B62D 25/085* (2013.01)

(58) Field of Classification Search
CPC ......... B60R 19/24; B60R 19/34; B60R 19/52; B60R 2019/1886; B60R 2019/525; B62D 25/084; B62D 25/085; B62D 21/15; B62D 21/152
See application file for complete search history.

(56) References Cited

U.S. PATENT DOCUMENTS

| | | | | |
|---|---|---|---|---|
| 7,222,896 | B2* | 5/2007 | Evans | B60R 19/18 |
| | | | | 293/121 |
| 10,358,167 | B2* | 7/2019 | Hayashi | B62D 25/084 |
| 10,486,745 | B1* | 11/2019 | Kim | B60R 19/18 |
| 10,696,254 | B2* | 6/2020 | Nakamoto | B60R 19/34 |

(Continued)

FOREIGN PATENT DOCUMENTS

| | | |
|---|---|---|
| DE | 10 2015 119269 A1 | 5/2016 |
| JP | 2015-196443 A | 11/2015 |

OTHER PUBLICATIONS

The extended European search report issued by the European Patent Office on Mar. 7, 2023, which corresponds to European Patent Application No. 22196523.9-1009 and is related to U.S. Appl. No. 17/812,353.

*Primary Examiner* — Gregory A Blankenship
(74) *Attorney, Agent, or Firm* — Studebaker & Brackett PC (57) ABSTRACT

A bumper-face support member extending in a vehicle width direction in front of a vehicle-body member provided at a vehicle-body front portion and having an attachment portion where a bumper face is attached, plural brackets fixedly connecting the vehicle-body member and the bumper-face support member, a bumper beam extending in the vehicle width direction below the bumper-face support member, and a stay connecting the bumper-face support member and the bumper beam in a vertical direction are provide. The stay has a deformation promotion portion configured to be bent so as to promote deformation of the stay when a collision load is downwardly inputted to the bumper-face support member.

8 Claims, 9 Drawing Sheets

(56) References Cited

U.S. PATENT DOCUMENTS

| | | | |
|---|---|---|---|
| 11,479,194 B2* | 10/2022 | Aizawa | B60R 19/12 |
| 2005/0017520 A1 | 1/2005 | Evans et al. | |
| 2005/0087999 A1 | 4/2005 | Campbell et al. | |
| 2007/0182174 A1 | 8/2007 | Nakayama et al. | |
| 2010/0127520 A1* | 5/2010 | Ginja | B60R 19/52 |
| | | | 293/146 |
| 2010/0213742 A1* | 8/2010 | Ritz | B62D 25/084 |
| | | | 296/193.09 |
| 2015/0115664 A1* | 4/2015 | Mildner | B62D 29/043 |
| | | | 296/203.02 |
| 2015/0343973 A1* | 12/2015 | Stoenescu | B60R 19/12 |
| | | | 293/133 |
| 2016/0137230 A1 | 5/2016 | Taneda | |
| 2017/0050509 A1* | 2/2017 | Aizawa | B60K 11/085 |
| 2018/0073822 A1* | 3/2018 | Garrisi | F02M 35/10268 |
| 2018/0347238 A1 | 12/2018 | Otani et al. | |
| 2019/0092393 A1* | 3/2019 | Yamatani | B60R 19/48 |
| 2021/0291639 A1* | 9/2021 | Pean | B60K 11/08 |
| 2023/0105286 A1* | 4/2023 | Tashiro | B60R 19/12 |
| | | | 293/133 |
| 2023/0106302 A1* | 4/2023 | Tashiro | B60R 19/12 |
| | | | 296/187.09 |

* cited by examiner

FRONT STRUCTURE OF VEHICLE

BACKGROUND OF THE INVENTION

The present invention relates to a front structure of a vehicle which comprises a bumper face provided at a vehicle front portion and a vehicle-body member supporting the bumper face from behind at a vehicle-body front portion.

Japanese Patent Laid-Open Publication No. 2015-196443 discloses a bumper attachment structure in which a bumper face is attached to a protrusion piece portion protruding forwardly from a radiator upper support as a vehicle-body member (a shroud upper provided at an upper portion of a radiator shroud).

As disclosed in the above-described patent document, a structure in which the bumper face is supported in a cantilever shape by the vehicle-body member, such as the shroud upper provided at the vehicle-body front portion is known.

Meanwhile, vehicles having a high vehicle-height are generally configured such that a front end portion of a bonnet (engine hood) provided at a front upper end of the vehicle is located at the same level as a thigh portion of a pedestrian. Accordingly, a structure in which the front end portion of the bonnet is retreated from a foremost portion of the vehicle so as to meet the pedestrian protection requirement, such as reduction of an influence on a knee's ligament of the pedestrian, in a vehicle collision against the pedestrian is known among the vehicles having the high vehicle-height.

Further, a latch which is configured to engage with a striker protruding downwardly from the bonnet in a bonnet's closed state and lock the bonnet is generally provided at the vehicle-body member, such as the shroud upper. Therefore, many of the vehicles having the high vehicle-height tend to have a structure in which the vehicle-body member, such as the shroud upper, is also retreated together with the bonnet according to the above-described retreat of the front end portion of the bonnet.

In this structure, however, since a length, in a vehicle longitudinal direction, between the bumper face and the vehicle-body member, such as the shroud upper supporting the bumper face in the cantilever shape from behind, becomes improperly long, a burden applied to a bracket which connects the bumper face and the vehicle-body member in the vehicle longitudinal direction becomes large, so that there is a concern that the support rigidity and the assembling accuracy of the bumper face may deteriorate.

For this problem, it may be considered that the bumper face is supported by a bumper beam provided just below the bumper face or the like from below via a stay.

In the vehicle collision against the pedestrian, it has been conventionally tried to sweep pedestrian's legs and make an pedestrian's upper body fall down onto the bonnet for the protection of a pedestrian's head portion, expecting the damping effect by the bonnet. However, since a collision area where the pedestrian's head portion hits against the bonnet moves forwardly more as the vehicle-height of the vehicle becomes higher, if the front portion of the bonnet becomes harder because the stay supporting the bumper face from just below is provided as described above, there occurs a new problem that the pedestrian's protection performance may deteriorate.

SUMMARY OF THE INVENTION

The present invention has been devised in view of the above-described problems, and an object of the present invention is to provide a front structure of a vehicle which can compatibly improve the support rigidity and the assembling accuracy of the bumper face in a normal state and the pedestrian's protection performance in a vehicle frontal collision even if the vehicle has the high vehicle-height.

The front structure of the vehicle of the present invention comprises a vehicle-body member provided at a vehicle-body front portion, a bumper-face support member extending in a vehicle width direction in front of the vehicle-body member and having an attachment portion where a bumper face is attached, plural brackets fixedly connecting the vehicle-body member and the bumper-face support member, a bumper beam extending in the vehicle width direction below the bumper-face support member, and a stay connecting the bumper-face support member and the bumper beam in a vertical direction, wherein the stay has a deformation promotion portion configured to be bent so as to promote deformation of the stay when a collision load is downwardly inputted to the bumper-face support member.

According to the present invention, since the stay is stretched against the downward load inputted to the bumper-face support member in the normal state, the bumper-face support member is suppressed from being deformed downwardly, so that the support rigidity and the assembling accuracy of the bumper face in the normal state can be improved. Meanwhile, since the deformation promotion portion is bent and deformed in a case where the downward collision load is inputted to the bumper-face support member, the damage degree of a collision object can be reduced, so that the pedestrian's protection performance in the vehicle frontal collision can be improved.

In an embodiment of the present invention, the bracket may comprise an indirect bracket to fixedly connect a shroud upper as the vehicle-body member and the bumper-face support member via the stay, and the indirect bracket may be configured to fixedly connect the shroud upper and the stay therebetween.

According to this embodiment, since the stay can support the bumper-face support member in a state where the stay is supported by the indirect bracket, the support rigidity and the assembling accuracy of the bumper face in the normal state can be further improved.

In another embodiment of the present invention, the stay may comprise a first extension portion extending downwardly and a second extension portion extending obliquely downwardly-and-forwardly from a lower end of the first extension portion via a bending portion as the deformation promotion portion.

According to this embodiment, since when the downward collision load is inputted to the bumper-face support member, the load transmitted to the stay from the bumper-face support member focuses on the bending portion, the stay can be bent and deformed securely by making the bending portion be a bending causing point, and the deformation promotion portion can be constituted with a simple structure in which a part of the stay is formed in a bending shape.

In another embodiment of the present invention, the stay may be connected to the bumper-face support member via a gusset, and the gusset may comprise a lateral plate portion extending in a vehicle longitudinal direction and supporting the bumper-face support member and a vertical plate portion downwardly extending from the lateral plate portion and fixed to a point of the stay which is located above the deformation promotion portion.

According to this embodiment, when the downward collision load is inputted to the bumper-face support member, this collision load can be firmly received by the lateral plate portion and also efficiently transmitted to the lower-located deformation promotion portion of the stay via the vertical plate portion.

That is, the stay can be prevented from being improperly deformed at any other point than the deformation promotion portion, which may be caused by some unexpected bending moment applied to the stay during the above-described load's transmission to the stay from the bumper-face support member. Thus, the stay can be securely deformed at a target point (i.e., the deformation promotion portion).

In another embodiment of the present invention, the vertical plate portion may extend downwardly from a rear end of the lateral plate portion, and the lateral plate portion may support the bumper-face support member in front of the vertical plate portion.

According to this embodiment, since the vertical plate portion extends downwardly from the rear end of the lateral plate portion, the lateral plate portion is configured to support the bumper-face support member from a forward side of the vertical plate portion. Thereby, the bumper-face support member can be supported by the lateral plate portion at a properly front-side vehicle's end position without arranging the stay itself at the forward position.

Accordingly, the length, in the vehicle longitudinal direction, of the indirect bracket can be properly suppressed, allowing a situation where the distance, in the vehicle longitudinal direction, between the bumper-face support member (bumper face) and the shroud upper becomes long according to the retreat of the front end of the bonnet, so that the support rigidity and the assembling accuracy of the bumper face in the normal state can be improved.

In another embodiment of the present invention, a front end of the indirect bracket extending in the vehicle longitudinal direction may be attached to a point of the stay which is located above the deformation promotion portion in the vertical direction.

According to this embodiment, even in the structure in which the bumper-face support member is arranged in front of the vehicle-body member, the support rigidity and the assembling accuracy of the bumper face in the normal state can be improved.

In another embodiment of the present invention, an attachment position of the indirect bracket to the stay may be located below the lateral plate portion.

According to this embodiment, an upper portion of the stay can be supported by the indirect bracket at a lower position which is closer to the deformation promotion portion than the lateral plate portion. Thereby, a lower end of the upper portion (first extension portion) is prevented from protruding downwardly when the stay is bent at the deformation promotion portion in a vehicle light collision, so that it can be suppressed that an auxiliary component, such as a radiator, is damaged by the stay.

In another embodiment of the present invention, the stay may have a stay-reinforcing ridgeline which extends, in an extension direction of the stay, continuously over a range of the deformation promotion portion and a gusset-reinforcing ridgeline which extends, in an extension direction of the gusset, continuously over a range of the vertical plate portion and the lateral plate portion, and the stay-reinforcing ridgeline and the gusset-reinforcing ridgeline may be located substantially at the same position in the vehicle width direction in a state where the vertical plate portion is fixed to the stay.

According to this embodiment, since the stay-reinforcing ridgeline is formed at the stay, the stay is prevented from being deformed unexpectedly at the deformation promotion portion by a load applied from below in the normal state, so that the bending rigidity can be secured.

Further, when the downward collision load is inputted to the bumper-face support member, this load can be efficiently transmitted to the lateral plate, the vertical plate portion, and the stay in order along the gusset-reinforcing ridgeline and the stay-reinforcing ridgeline. Accordingly, the stay can be securely deformed at the deformation promotion portion when the downward collision load is inputted to the bumper-face support member.

As described above, according to the present invention, the support rigidity and the assembling accuracy of the bumper face in the normal state and the pedestrian's protection performance in the vehicle frontal collision can be compatibly improved even if the vehicle has the high vehicle-height.

The present invention will become apparent from the following description which refers to the accompanying drawings.

DETAILED DESCRIPTION OF THE INVENTION

Hereafter, an embodiment of the present invention will be described referring to the drawings. In the drawings, an arrow F shows a vehicle forward side, an arrow U shows a vehicle upward side, an arrow R shows a vehicle rightward side, and an arrow L shows a vehicle leftward side.

A vehicle to which a front structure of the present invention is applied is an automobile, such as SUV or minivan, which has a relatively high vehicle-height compared with a sedan type or a hutch-back type. The front structure of the vehicle of the present embodiment is configured to be substantially symmetrical laterally.

Figure 1:
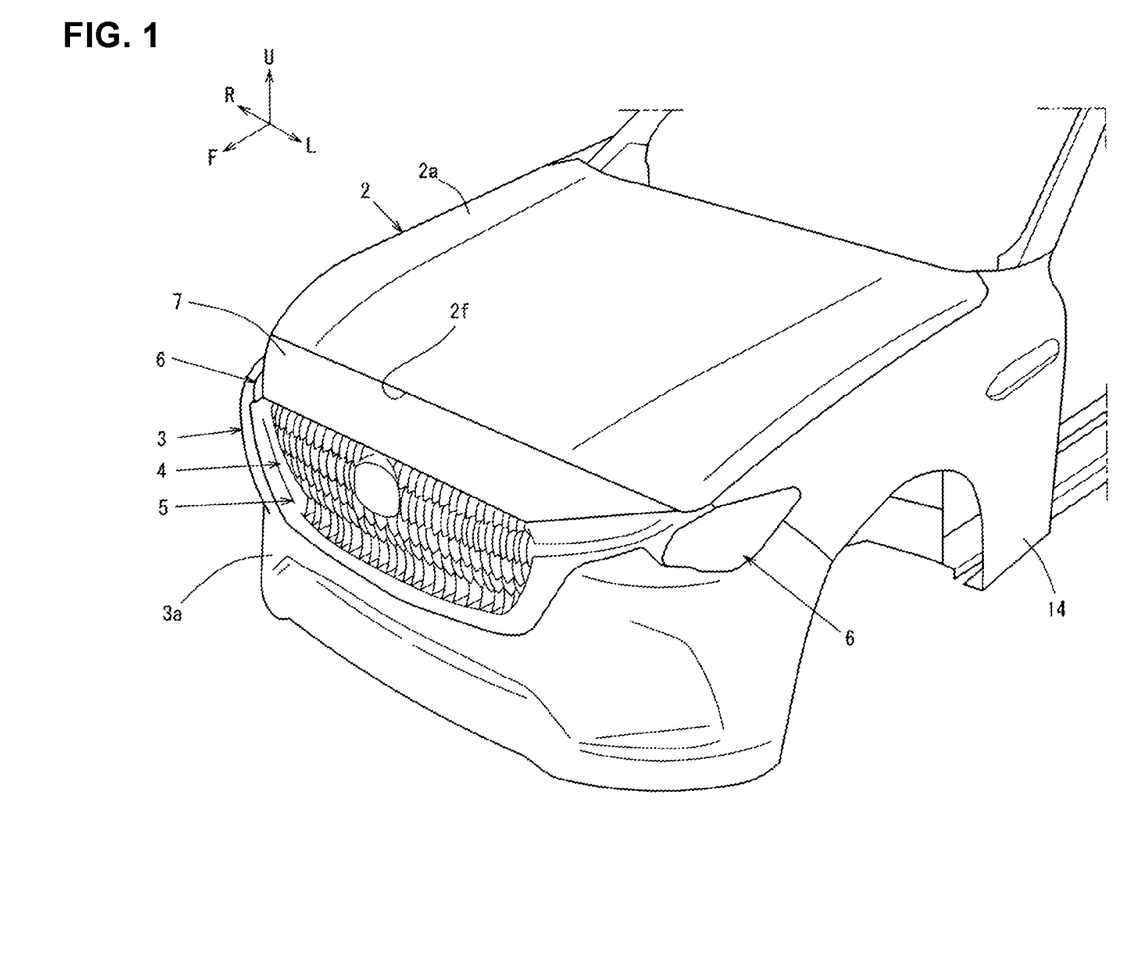
FIG. 1 is an exterior perspective view of a front portion of a vehicle of the present embodiment.

As shown in FIG. 1, a front portion of the vehicle is provided with a bonnet 2 which covers over a power-unit room 1 (see FIG. 2) where a power unit (not illustrated), such as an engine, is installed and a bumper face 3 which is made of synthetic resin and arranged at a foremost position of the vehicle. A front-face opening portion 4 to take in flesh air (traveling air) into a vehicle body is formed at the bumper face 3.

The front-face opening portion 4 is formed at a portion of the bumper face 3 which is located at an upper-and-central side, in a vehicle width direction, of the bumper face 3, which is an outside-air induction port to introduce outside air for cooling into the power-unit room 1 in order to assist heat radiation of a radiator 19 (see FIG. 8) which is arranged at a front side of the power-unit room 1 located and in back of the bumper face 3.

The front-face opening port 4 is covered with a front grille 5 in a state where the air permeability of the power-unit room 1 is secured. A pair of headlight opening portions 6 for arranging headlamps 6a (see FIG. 4) are formed at right-and-left upper portions of the bumper face 3.

The front grille 5 extends laterally up to an inside portion, in the vehicle width direction, of each of the headlight opening portions 6 at a position which corresponds, in a front view, to the front-face opening portion 4 provided at a central portion, in the vehicle width direction, of the bumper face 3, and is attached to the bumper face 3.

At an upper-end side of the bumper face 3 is provided a bumper face upper 7 which constitutes an upper end portion of the bumper face 3 and is continuous to a front end 2f of the bonnet 2. The bumper face upper 7 is a portion which is integrally formed at a body portion 3a (lower portion) of the bumper face 3, which forms respective upper-side parts of the front-face opening portion 4 and the right-and-left headlight opening portions 6. The bumper face upper 7 is a flat-plate member with an upper face which has an inclination corresponding to a front-lowering inclination of an upper face of the bonnet 2.

The bonnet 2 is pivotally supported at the vehicle body via a hinge (not illustrated) through its rear end so that it is openable over the power-unit room 1.

Figure 6:
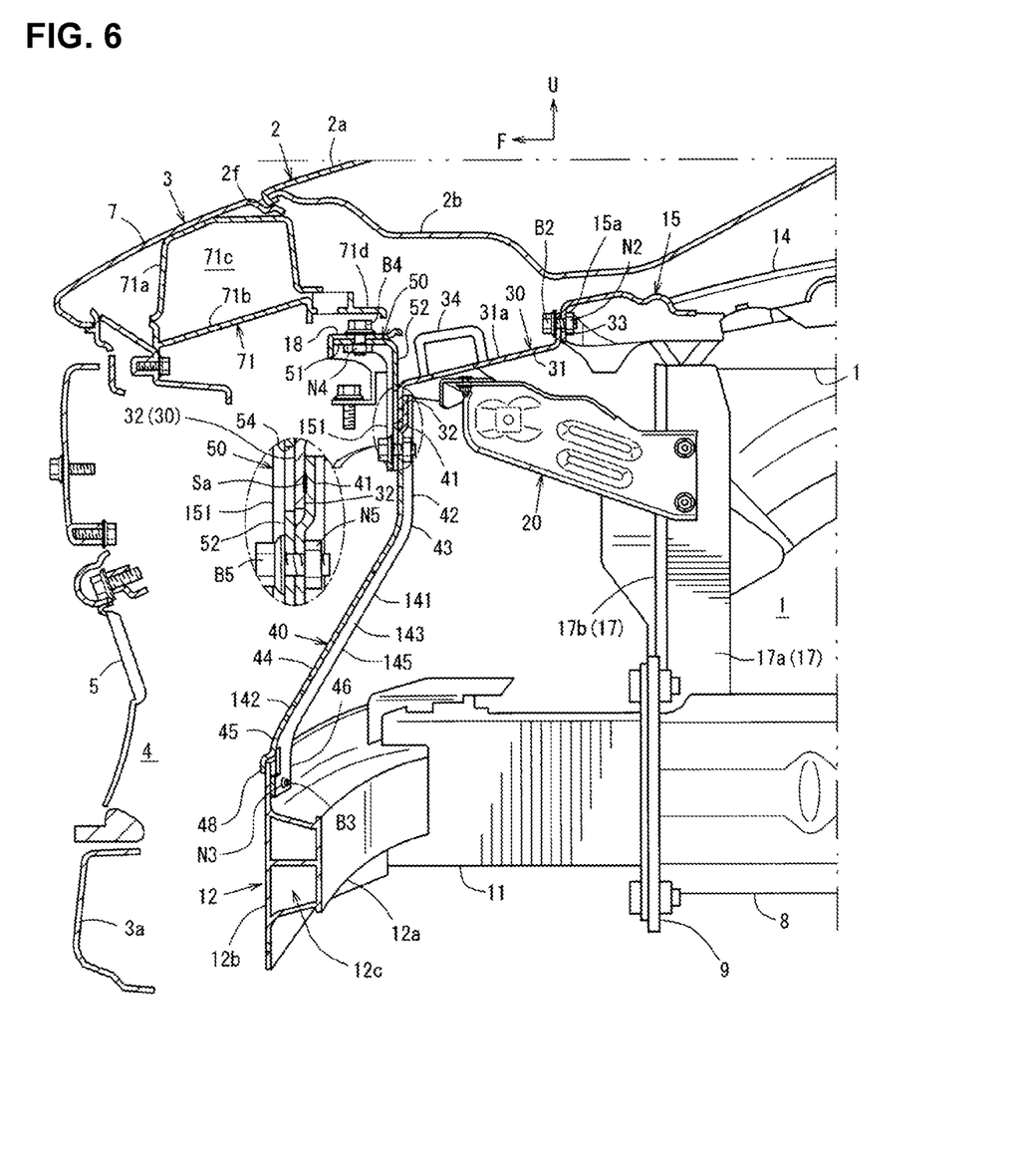
FIG. 6 is a sectional view taken along line A-A in FIG. 4.

As shown in FIG. 6, the bonnet 2 is comprised of a bonnet outer panel 2a and a bonnet inner panel 2b which are integrated by means of hemming joint, and a bonnet reinforcement, not illustrated, is adhesively fixed to a lower-face side of the bonnet outer panel 2a.

Herein, at a front portion of a central portion, in the vehicle width direction, of the bonnet inner panel 2b is provided a striker (not illustrated) which protrudes downwardly. This striker is configured to engage with a latch (not illustrated) provided at a vehicle-body side in a closed state of the bonnet 2 for locking.

Figure 2:
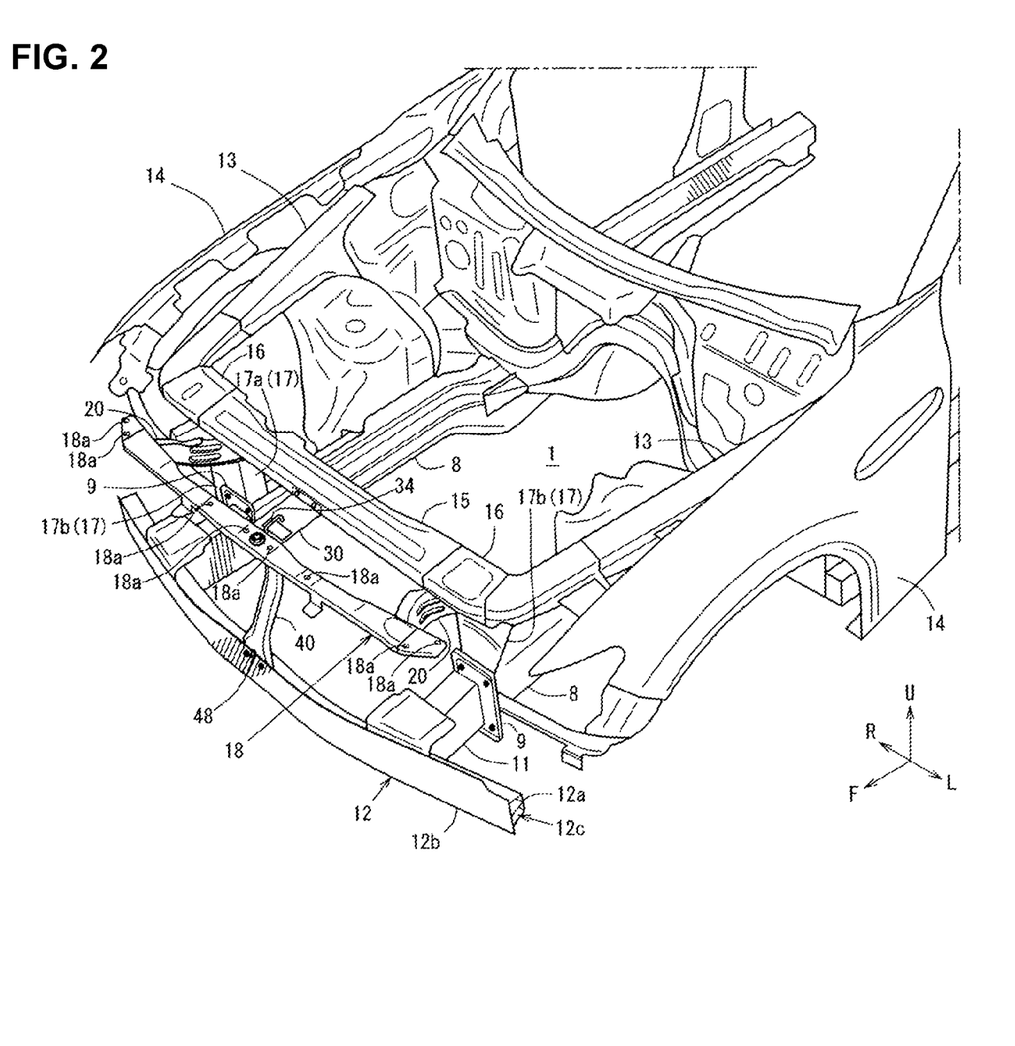
FIG. 2 is a perspective view of the front portion of the vehicle of the present embodiment.
Figure 3:
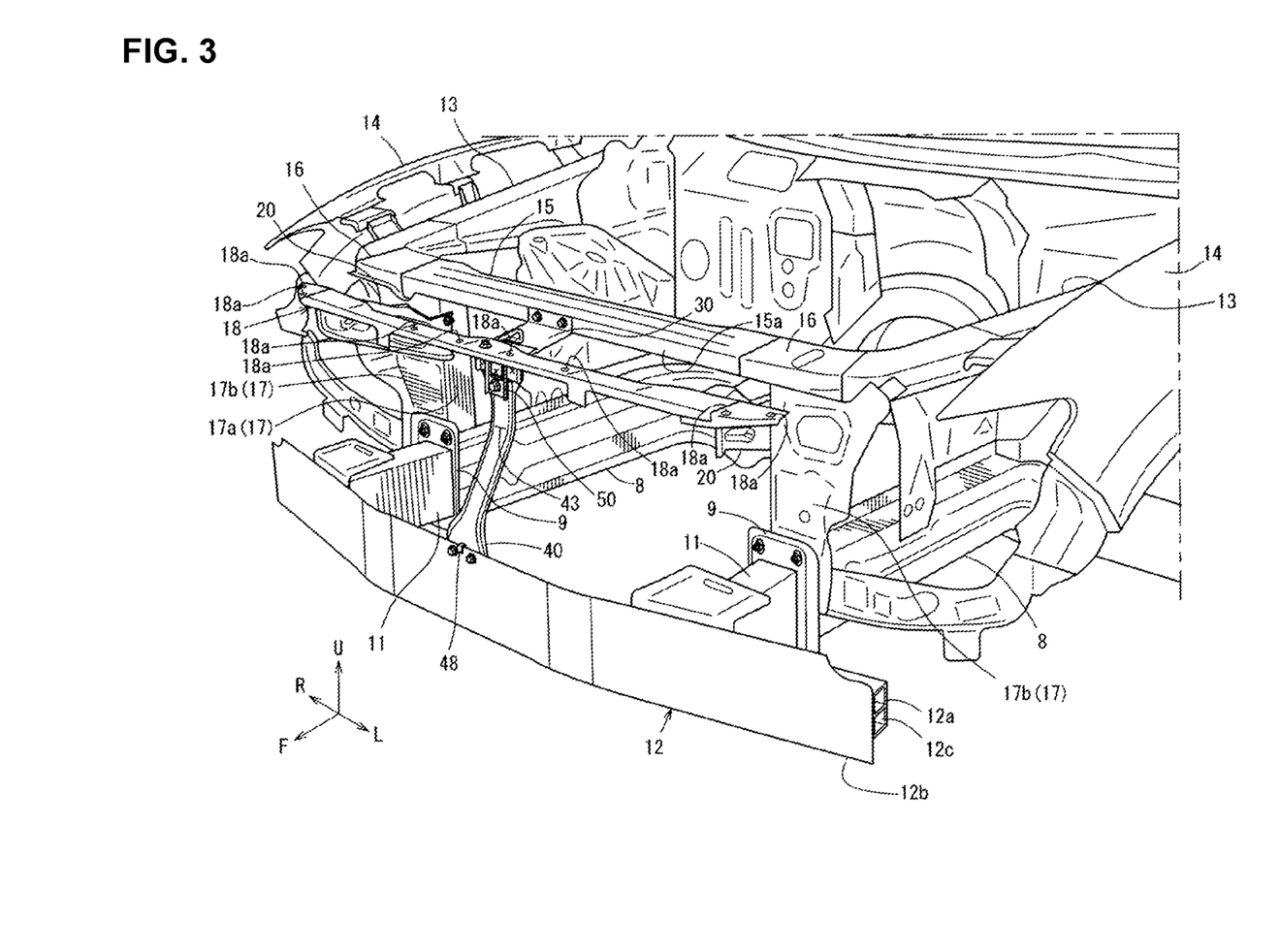
FIG. 3 is an enlarged perspective view of the front portion of the vehicle, when viewed from a further front side in FIG. 2.
Figure 4:
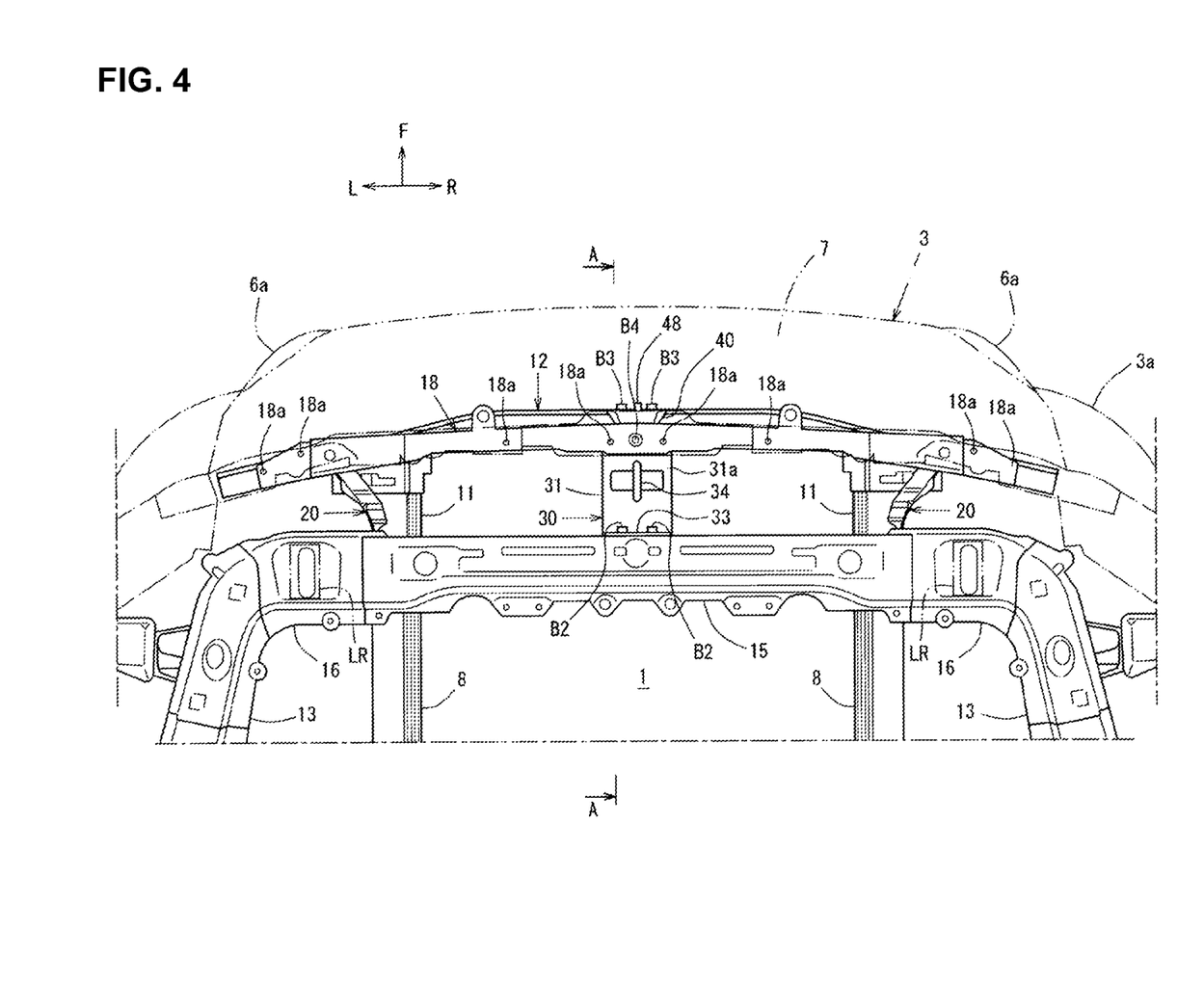
FIG. 4 is a plan view showing a major part of the front portion of the vehicle of the present embodiment.

As shown in FIGS. 2-4, a front side frame 8 extending in a vehicle longitudinal direction is provided at each of right-and-left both sides of the power-unit room 1. A crash can 11 extending forwardly is attached to a front end of the front side frame 8 via a set plate 9 (see FIGS. 2 and 3).

As shown in FIGS. 2-4, a bumper beam 12 (bumper reinforcement) which extends in the vehicle width direction so as to interconnect respective front ends of the right-and-left crash cans 11 is provided at a front-side position of the power unit room 1 which is located below and behind the bumper face 3.

As shown in FIGS. 2 and 3, the bumper beam 12 is primarily composed of a bumper-beam body portion 12a which has a nearly hat-shaped cross section opened forwardly and a closing plate portion 12b which closes a forwardly-opened portion of the bumper-beam body portion 12a, and a closed-cross section 12c extending in the vehicle width direction is formed between the bumper-beam body portion 12a and the closing plate portion 12b. As shown in FIG. 6, the bumper beam 12 is positioned at the front end 2f of the bonnet 2 in the vehicle longitudinal direction.

Further, a pair of right-and-left apron reinforcements 13 extending in the vehicle longitudinal direction are provided at upward-side positions inside the vehicle front portion which are located on the outward side, in the vehicle width direction, of the front side fames 8. Herein, in FIGS. 2 and 3, reference character 14 denotes a fender panel which forms an outside face of a vehicle-body front portion, which is supported at the apron reinforcement 13.

As shown in FIGS. 2-4, a shroud upper panel 15 extending straightly in the vehicle width direction is connected to each front end of the pair of right-and-left apron reinforcements 13 via a shroud member 16.

An engaging latch (not illustrated) to engage with a striker (not illustrated) provided at a side of the bonnet 2 as a lock device is arranged at the above-described shroud member 16. Herein, an area LR enclosed by an imaginary line in FIG. 4 corresponds to a latch arrangement point.

As shown in FIG. 4, each front portion of the right-and-left front side frames 8 is located just below an end-outside portion of the shroud upper panel 15. Further, as shown in FIGS. 2, 3, 5 and 6, the shroud member 16 and the front portion of the front side frame 8 are connected by a shroud-upper support frame 17 extending in a vertical direction.

That is, the shroud upper panel 15 is, as described above, supported by the pair of right-and-left apron reinforcements 13 via the shroud members 16 and supported by the pair of right-and-left front side frames 8 via the shroud members 16 and the shroud-upper support frames 17.

As shown in FIGS. 2, 3, 5 and 6, the shroud-upper support frame 17 is integrally formed by a vehicle-width-direction inner face portion 17a which is of a vertical wall shape and has its plate thickness in the vehicle width direction and a front face portion 17b which is of the vertical wall shape, extends outwardly, in the vehicle width direction, from a front end of the vehicle-width-direction inner face portion 17a, and has its plate thickness in the vehicle longitudinal direction.

Herein, each of the apron reinforcement 13, the shroud upper panel 15, the front side frame 8, the shroud-upper support frame 17, the shroud member 16, and the bumper beam 12 is a vehicle-body member.

Further, as shown in FIGS. 2-4, at a position inside the vehicle front portion which is located in front of the shroud upper panel 15 is arranged a bumper-face support member 18 with a bumper-face attachment hole 18a where the bumper face 3 (see FIG. 1) is attached by a fastening means (bolt and nut), not illustrated.

The bumper-face support member 18 extends in the vehicle width direction having a slightly shorter extension length than the bumper beam 12 (see FIG. 4), and is arranged substantially at the same level as the shroud upper panel 15 at a position which nearly corresponds to the front portion of the bonnet 2 in the vehicle longitudinal direction, in other words, substantially at the same position as the bumper beam 12 in the vehicle longitudinal direction (see FIG. 6).

The bumper-face attachment hole 18a is comprised of plural holes which are arranged in the vehicle width direction at the bumper-face support member 18, and four holes are provided at each side of the member 18 except the center, in total eight holes, in the present embodiment (see FIGS. 2 and 4).

Meanwhile, inside the above-described bumper face 3 is provided a face-upper support member 71 to support the bumper face upper 7 provided at the bumper face 3 from just below as shown in FIG. 6. The face-upper support member 71 extends in the vehicle width direction so as to support the bumper face 3.

Further, as shown in FIG. 6, the face-upper support member 71 comprises primarily two members, an upper-side member 71a which has a nearly hat-shaped cross section opened downwardly and a lower-side member 71b which closes a downwardly-opened portion of the upper-side member 71a, and a closed-cross section 71c extending in the vehicle width direction is formed between the upper-side member 71a and the lower-side member 71b.

Figure 8:
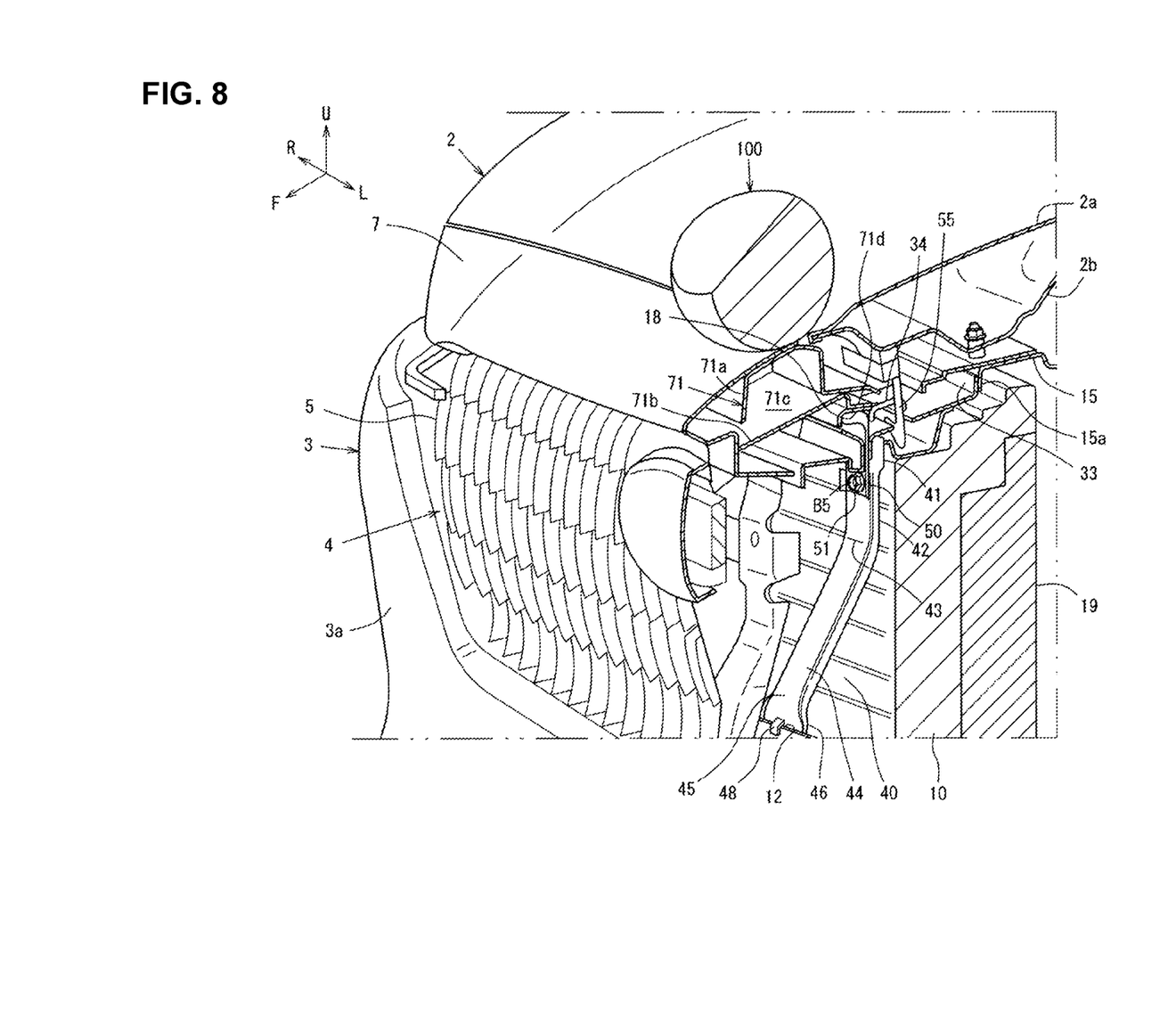
FIG. 8 is a perspective sectional view taken along line A-A in FIG. 4, which shows a situation just before a collision object hits against a front end of a bonnet from above.

A rear flange portion 71d which extends rearwardly so as to contact the bumper-face support member 18 from above is formed at a rear end of a lower portion of the face-upper support member 71 (see FIGS. 6 and 8). The rear flange portion 71d extends in the vehicle width direction having substantially the same extension length as the bumper-face support member 18, and has bumper-face support member holes (not illustrated) at its plural points which correspond to the bumper-face attachment holes 18a.

The bumper-face support member holes (not illustrated) and the bumper-face attachment holes 18a are joined together by using fastening means, such as bolts and nuts (not illustrated) in a state where the rear flange portion 71d is supported by the bumper-face support member 18. Thus, the bumper face 3 is supported by the bumper-face support member 18.

Moreover, as shown in FIG. 8, a radiator shroud 10 is arranged in a front area of the power unit room 1 at a position behind the bumper-face support member 18. The radiator shroud 10 is supported at the vehicle-body member (e.g., the shroud upper panel 15, the front side frame 8 and the like).

The radiator shroud 10 is configured to be rectangular, in an elevational view, and arranged in the front area of the power unit room 1 at a position between the front side frames 8, and supports the radiator 19 and others. The radiator shroud 10 and the radiator 19 are provided to stand and face the front-face opening 4 from behind, respectively.

Further, as shown in FIGS. 2-6, at the front portion of the vehicle body are provided plural brackets 20, 30 which fixedly connect the vehicle-body member (15, 17) and the bumper-face support member 18 and a stay 40 which connects the bumper-face support member 18 and the bumper beam 12 in the vertical direction at the front portion of the vehicle body.

The brackets 20, 30 comprise the outside brackets 20 which are arranged at both outsides, in the vehicle width direction, of the vehicle body and the center bracket 30 which is arranged at the middle, in the vehicle width direction, of the vehicle body (i.e., the position corresponding to the stay 40 in the vehicle width direction). Thus, there are three brackets in total.

Figure 5:
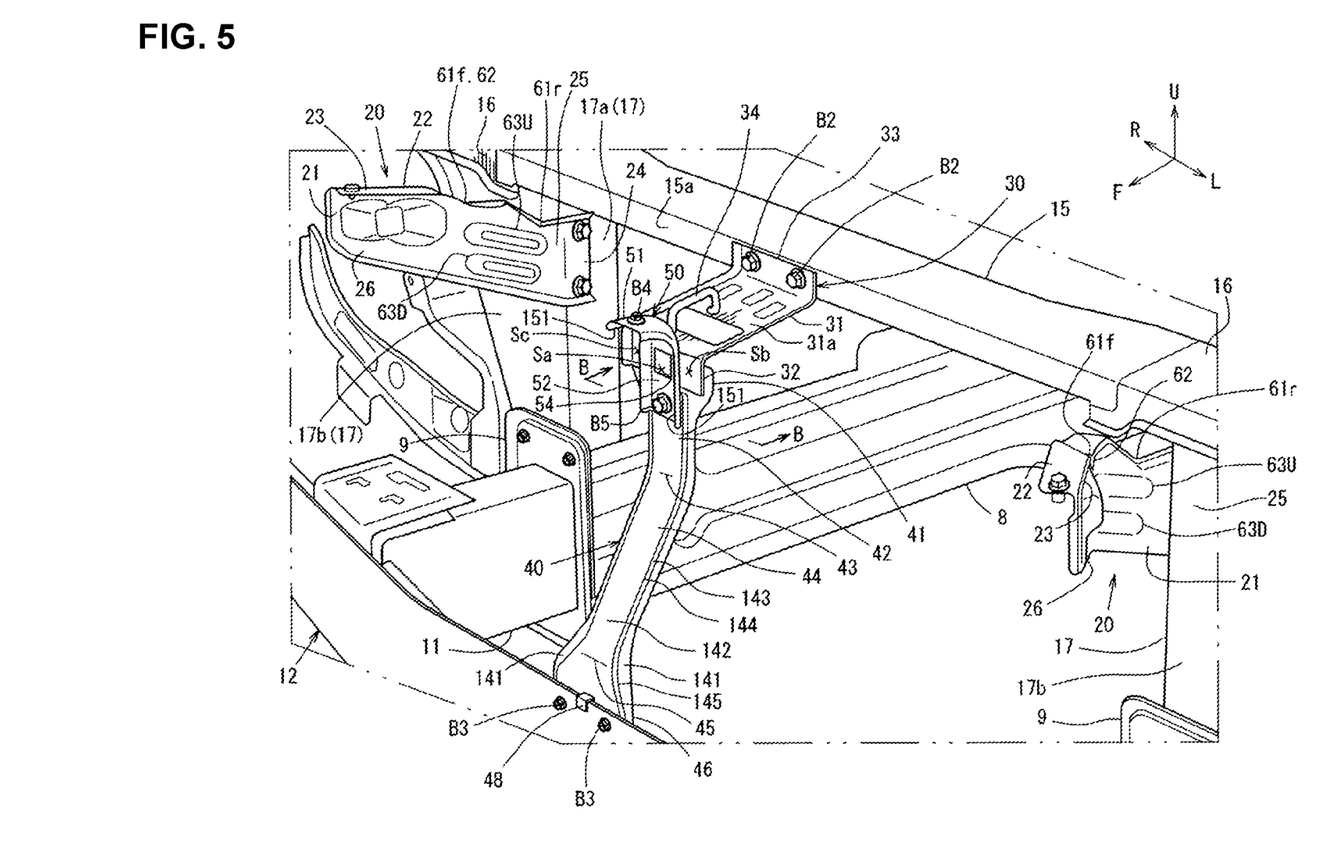
FIG. 5 is an enlarged perspective view of a central part, in a vehicle width direction, of the front portion of the vehicle in a state where a bumper-face support member is removed in FIG. 3.

As shown in FIG. 5, the outside brackets 20 are configured to be laterally symmetrical, and each of these comprises a side wall portion 21 which extends in the vertical direction and in the vehicle longitudinal direction and an eaves-shaped flange portion 22 which protrudes inwardly, in the vehicle width direction, from an upper end of the side wall portion 21 via a corner portion 23, which is made of a metal plate which is bent through pressing process or the like.

In other words, the outside bracket 20 comprises a fixation portion 24 for fixation to the shroud-upper support frame 17 as a vehicle-body member, a base portion 25 which extends forwardly from the fixation portion 24, and an inclination portion 26 which is inclined relative to the base portion 25.

The outside bracket 20 comprises high-rigidity portions 63U, 63D and fragile portions 62, 61f, 61r. At least part of each of the high-rigidity portions 63U, 63D is positioned at the inclination portion 26, and each of the high-rigidity portions 63U, 63D is configured to have the high rigidity against an input of a load applied in the vehicle longitudinal direction. Each of the fragile portions 62, 61f, 61r is configured to be deformable by receiving the input of the load applied in the vehicle longitudinal direction. The high-rigidity portions 63U, 63D and the fragile portions 62, 61f, 61r are provided adjacently to each other in the vehicle longitudinal direction.

As shown in FIGS. 4-6, the middle bracket 30 comprises a bracket body portion 31 which extends straightly in the vehicle longitudinal direction, in a vehicle plane view, between the stay 40 and the shroud upper panel 15 and a front flange portion 32 and a rear flange portion 33, which are formed integrally. In the present embodiment, the middle bracket 30 is made of a plate member extending in the vehicle longitudinal direction and in the vehicle width direction which is bent through pressing process or the like.

As shown in FIG. 6, the bracket body portion 31 is arranged to be slightly inclined relative to a horizontal line such that its front side is located at a lower level, and the bracket body portion 31 extends straightly in the vehicle longitudinal direction such that its front end is located slightly above an upper end of the stay 40 and its rear end is located at a lower end of a lower flange portion 15a which extends downwardly from a front end of the shroud upper panel 15. Herein, as shown in FIGS. 5 and 6, a striker of a safety lock device is provided to stand upwardly at an upper face portion 31a of the bracket body portion 31.

Herein, an engaging lever 55 of the safety lock device (see FIG. 8) is provided at a front central portion of the bonnet 2 so as to engage with or disengage from a striker 34. The safety lock device is a known device which is configured to restrain an opening move of the bonnet 2 even if a lock of a lock device (not illustrated) is released unexpectedly, thereby keeping a slightly-opened state of the bonnet 2, in order that the bonnet 2 is prevented from opening improperly because of a traveling-air pressure or the like during vehicle traveling. In the present embodiment, the safety lock device is arranged at a different position from the lock device (see the area LR enclosed by the imaginary line in FIG. 4) as described above (see FIG. 4).

As shown in FIGS. 5 and 6, the front flange portion 32 extends downwardly from a front end of the bracket body portion 31, and the bracket body portion 31 extends forwardly from a vehicle rearward side such that its front portion straddles an upper end of the stay 40 from above. Thereby, the front flange portion 32 contacts an upper portion of the stay 40 (an upper portion of an upper flange portion 41 described later) from a vehicle forward side.

The front flange portion 32 is configured to have the nearly same length, in the vehicle width direction, as the upper flange portion 41 (see FIG. 5). Accordingly, the front flange portion 32 and the upper flange portion 41 are provided to contact each other over a whole length, in the vehicle width direction, thereof.

The upper flange portion 41 and the front flange portion 32 are joined together by spot welding. In the present embodiment, the upper flange portion 41 and the front flange portion 32 are spot-welded at, in total, three points of a central point Sa and both-side points Sb, Sc. An "X" mark in FIG. 5 shows a spot-welding application point. That is, the joint points (Sa, Sb, Sc) of the middle bracket 30 and the stay 40 are located at an upper level than (i.e., above) a first bending portion 43 which will be described later as a deformation promotion of the stay 40.

Meanwhile, the rear flange portion 33 extends upwardly from a rear end of the bracket body portion 31, and contacts the lower flange portion 15a of the shroud upper panel 15 from the vehicle forward side. The rear flange portion 33 of the middle bracket 30 and the lower flange portion 15a of the shroud upper panel 15 are fastened together by a bolt B2 and a nut N2 as fastening means (see FIG. 6).

Thus, the middle bracket 30 connects the shroud upper panel 15 and the stay 40. As shown in FIGS. 2, 3 and 6, the stay 40 connects the bumper-face support member 18 and the bumper beam 12 in the vertical direction at the nearly center, in the vehicle width direction, of the vehicle body at the front side of the power-unit room 1. Thereby, the bumper-face support member 18 is supported at the bumper beam 12 via the stay 40.

The stay 40 is made of a meal member which has a width in the vehicle width direction and is long in the vertical direction. Specifically, as shown in FIGS. 5 and 6, the stay 40 comprises the upper flange portion 41, a first extension portion 42 which straightly extends downwardly from a lower end of the upper flange portion 41 in the vertical direction, a second extension portion 44 which straightly extends from a lower end of the first extension portion 42 via the first bending portion 43 in an inclined shape such that its lower side is located on the vehicle forward side, and a lower flange portion 46 which extends downwardly from a lower end of the second extension portion 44 via a second bending portion 45. The above-described first bending portion 43 is a deformation promotion portion which is configured to be bent when a collision load applied downwardly is inputted to the bumper-face support member 18, and this first bending portion 43 of the present embodiment is configured such that an angle between the first extension portion 42 and the second extension portion 44 becomes about 150 degrees, for example.

The upper flange portion 41 and the lower flange portion 46 are configured to be slightly longer than a middle part, in the vertical direction, of the stay 40 (i.e., the first extension portion 42 and the second extension portion 44) in the vehicle width direction.

A lower part of the upper flange portion 41 is configured such that its width becomes gradually wider from the upper end of the first extension portion 42 toward the upper side. An upper part of the lower flange portion 46 is configured such that its width becomes gradually wider from the lower end of the second extension portion 44 toward the lower side.

Figure 7:
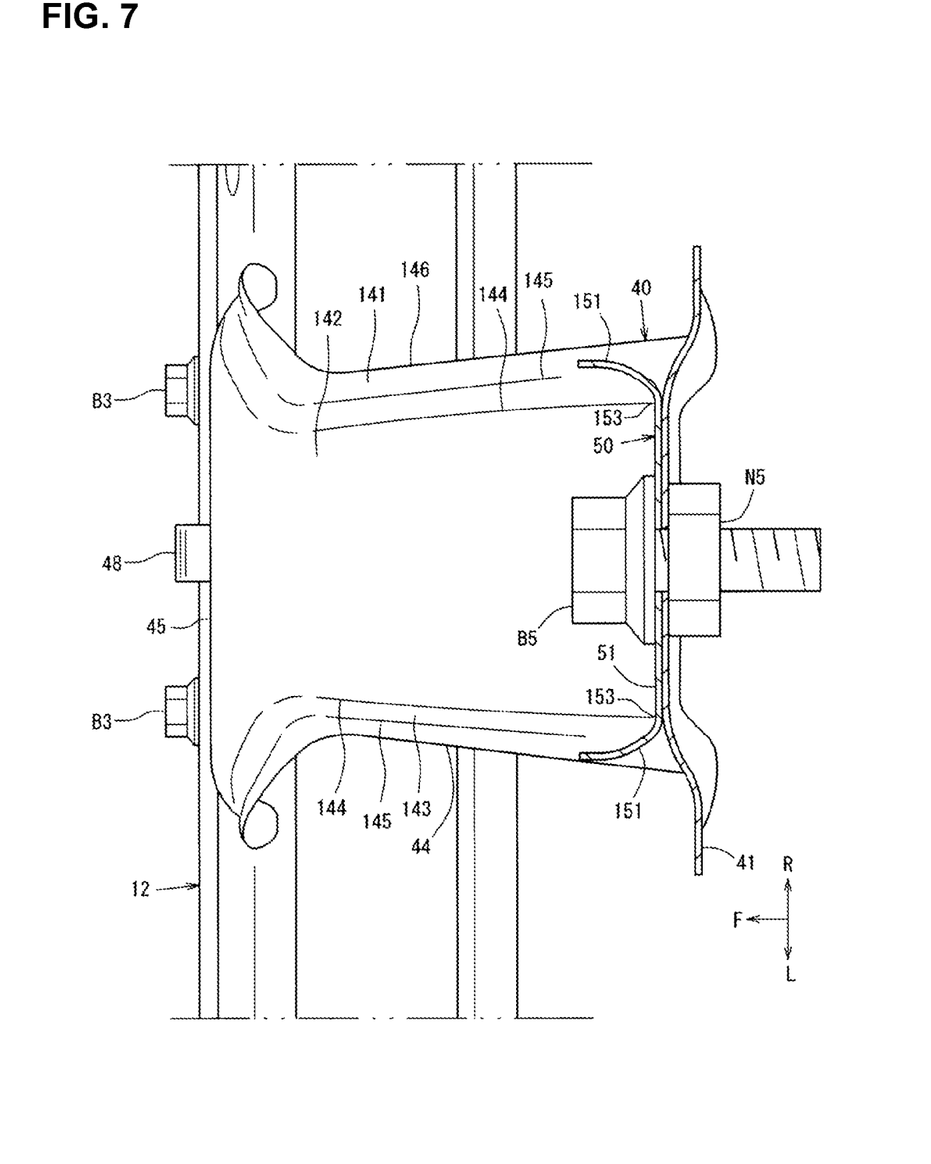
FIG. 7 is an enlarged sectional view taken along line B-B in FIG. 5.

The stay 40 is configured such that its cross section perpendicular to the vertical direction (its extension direction) is nearly horizontal in the vehicle width direction over its whole length. However, as shown in FIGS. 5-7, the stay 40 has a step portion 143 extending in the vehicle longitudinal direction at a position between its outward-side portion 141 and its central-side portion 142 such that the outward-side portion 141 is located on the vehicle rearward side of the central-side portion 142.

The step portion 143 continuously extends in the vertical direction at a part of the stay 40 except an upper part of the upper flange portion 41 (see FIG. 5). Thereby, as shown in FIGS. 5 and 7, a stay-reinforcing ridgeline 144 is formed at a corner portion between the step portion 143 and the central-side portion 142, and a stay-reinforcing ridgeline 145 is formed at a corner portion between the step portion 143 and the outward-side portion 141. These stay-reinforcing ridgelines 144, 145 extend continuously in the extension direction of the stay 40 (in the vertical direction), including the first bending portion 43 and the second bending portion 45.

The lower flange portion 46 is fixed to a central portion, in the vehicle width direction, of the bumper beam 12 by a bolt B3 and a nut N3 in a state where it contacts an upper part of the closing plate portion 12b from behind.

Further, an engaging hook 48 which protrudes forwardly and has its tip projecting downwardly is formed at a base portion (upper portion) of the lower flange portion 46. The engaging hook 48 engages with an upper end of the closing plate portion 12b at the bumper beam 12 in a state where the lower flange portion 46 contacts the upper part of the closing plate portion 12b from behind as described above.

As shown in FIGS. 5 and 6, the stay 40 is connected to the bumper-face support member 18 via a gusset 50.

The gusset 50 comprises a lateral plate portion 51 which extends horizontally in the vehicle longitudinal direction and supports a lower side of the bumper-face support member 18 and a vertical plate portion 52 which extends downwardly from a rear end of the lateral plate portion 51, which is made of a metal plate extending in an inverse-L shape in a vehicle side view and has its width in the vehicle width direction.

The gusset 50 is located at the central portion, in the vehicle width direction, of the bumper-face support member 18, and the bumper-face support member 18 and the lateral plate portion 51 located just below the bumper-face support member 18 are fixedly fastened by fastening means (a bolt B4 and a nut N4). That is, the bumper-face support member 18 is supported by the lateral plate portion 51 extending forwardly from an upper end of the vertical plate portion 52 in a cantilever shape at a position located in front of the vertical plate portion 52.

The gusset 50 is configured such that it has the same width over its whole length in the its extension direction and it has substantially the same length as the central-side portion 142 of the stay 40 in the vehicle width direction. In particular, in FIG. 7, a bending portion 151 which is configured to be bent in such a manner that it stands toward one direction in the plate-thick direction over its whole length in the extension direction is formed at each of both-side portions, in the vehicle width direction, of the gusset 50. In the present embodiment, the bending portion 151 is configured such that it is bent downwardly at the lateral plate portion 51 and it is bent forwardly at the vertical plate portion 52, and the bending portion 151 is formed continuously along its extension direction.

Thus, the gusset-reinforcing ridgeline 153 which extending continuously over the whole length of the gusset 50 (the vertical plate portion 52 and the lateral plate portion 51) is formed at a base end portion of the bending portion 151 (a border portion between the bending portion 151 and a flat-plate shaped vehicle-width-direction central portion) (see FIG. 7).

As shown in FIGS. 5 and 6, the vertical plate portion 52 is fixed to a point of the stay 40 which is located above the first bending portion 43, i.e., the upper flange portion 41.

The vertical plate portion 52 is made to contact the central-side portion 142 of the upper flange portion 41 from the vehicle forward side, and in this state, this portion 52 is fastened to the base portion (lower portion) of the upper flange portion 41 by fastening means (a bolt B5 and a nut N5) (see a major enlarged part in FIG. 6 and FIG. 7).

Herein, as described above, the front flange portion 32 of the middle bracket 30 is made to contact a tip portion (upper portion) of the upper flange portion 41 over a whole length, in the vehicle width direction, of the upper flange portion 41 from the vehicle forward side.

Therefore, as shown in FIGS. 5 and 6, by fastening the vertical plate portion 52 and the upper flange portion 41 together in a state where the vertical plate portion 52 contacts the upper flange portion 41 from the vehicle forward side as described above, the front flange portion 32 of the middle bracket 30 is held in a state where it is interposed between the vertical plate portion 52 and the upper flange portion 41 in the vehicle longitudinal direction.

Further, the upper flange portion 41 and the front flange portion 32 are joined together by spot welding as described above in the above-described state. Herein, deference character 54 in the major enlarged part in FIGS. 5 and 6 denotes an opening portion which is formed at a portion of the vertical plate portion 52 which covers the above-described spot-welding point (the spot-welding point Sb at the central portion in the vehicle width direction) from the vehicle forward side in order to allow the spot welding applied to the upper flange portion 41 and the front flange portion 32.

The vertical plate portion 52 of the gusset 50 is fixed to the stay 40 such that the lateral plate portion 51 extends forwardly from an upper end of the vertical plate portion 52 which extends upwardly from the upper end of the stay 40 and the middle bracket 30. Therefore, the gusset 50 is attached to the stay 40 such that the lateral plate portion 51 is located above the attachment position of the middle bracket 30 to the stay 40.

Further, as shown in FIG. 7, the stay-reinforcing ridgeline 144 and the gusset-reinforcing ridgeline 153 are located at the same position in the vehicle width direction in a state where the vertical plate portion 52 is fixed to the stay 40.

Figure 9:
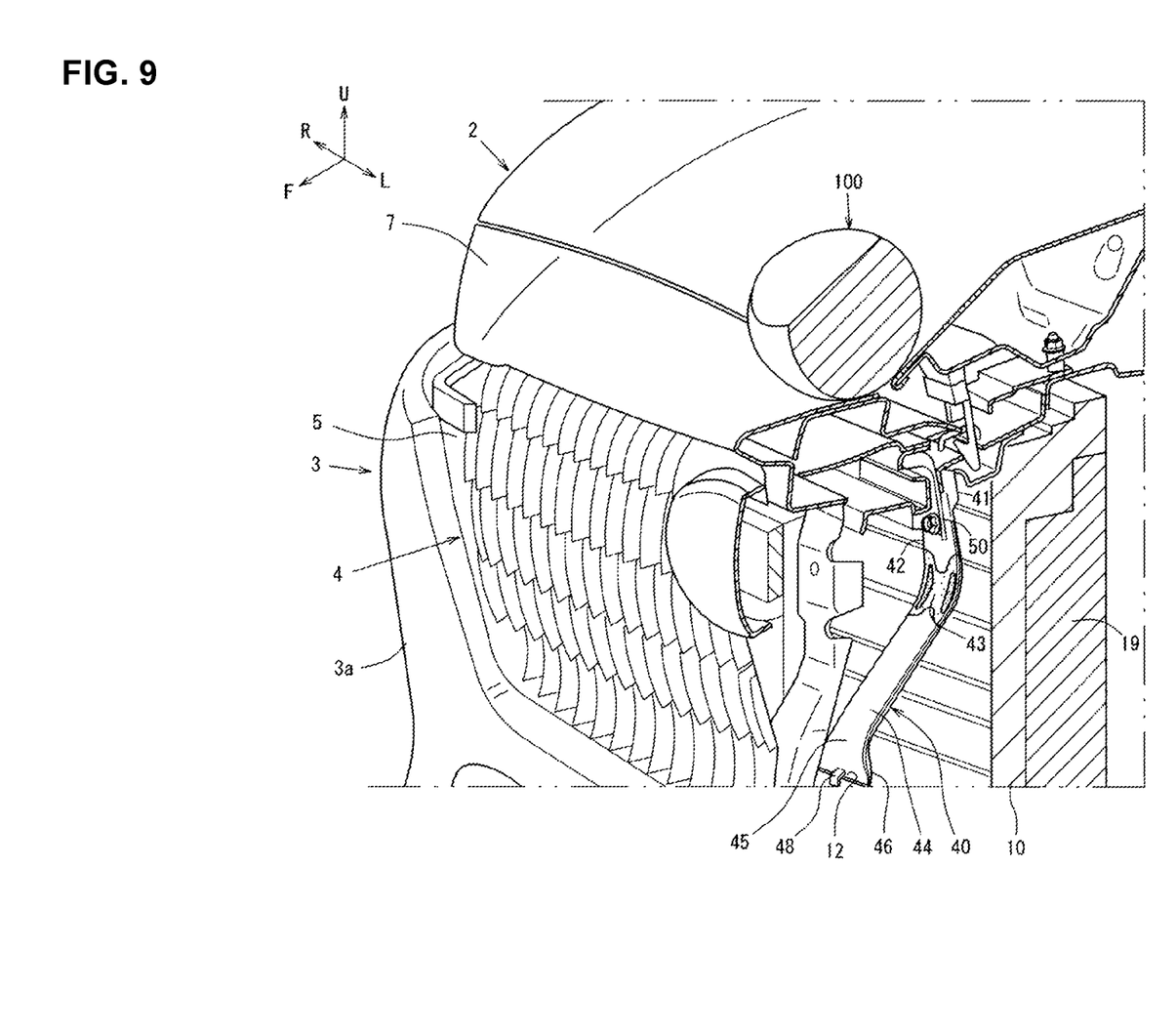
FIG. 9 is a perspective sectional view similar to FIG. 8, which shows a distribution of stresses applied to a stay just after the collision object hits against the front end of the bonnet from above.

Subsequently, a move of the stay 40 in a case where a collision object 100 hits against the vehicle front portion from above will be described referring to FIGS. 8 and 9. FIG. 8 is a perspective sectional view taken along line A-A in FIG. 4, which shows a situation just before the collision object 100 hits against the vehicle front portion, and FIG. 9 is a perspective sectional view similar to FIG. 8, which shows results of a simulation analysis of the move of the vehicle front portion just after the hitting of the collision object 100. FIG. 9 shows a distribution of stresses of the collision load inputted to the stay 40 is shown based on dots density, wherein a portion with a higher density of dots shows an area where a larger bending-stress is generated.

In a case where the collision object 100 hits against the vehicle front portion shown in FIG. 8 from above, the collision load inputted to an upper face of the vehicle front portion is transmitted downwardly through the bumper face upper 7, the face-upper support member 71, the gusset 50, and the stay 40 in this order (see FIG. 9).

The collision load inputted to the upper flange portion 41 of the stay 40 is transmitted further downwardly, i.e., to the first bending portion 43 as the deformation promotion portion via the first extension portion 42, where the stress focus as shown in FIG. 9. As apparent from this, the stay 40 can be securely deformed at the first bending portion 43 without being stretched against the downward collision load.

The front structure of the vehicle of the above-described resent invention comprises, as shown in FIGS. 2-6, the vehicle-body member (15, 17) provided at the vehicle-body front portion, the bumper-face support member 18 (see FIGS. 1-4 and 6) extending in the vehicle width direction in front of the vehicle-body member (15, 17) and having the bumper-face attachment hole 18a (attachment portion) where the bumper face 3 (see FIG. 1) is attached, the plural brackets 20, 30 (the outside bracket 20 and the middle bracket 30) fixedly connecting the vehicle-body member (15, 17) and the bumper-face support member 18, the bumper beam 12 extending in the vehicle width direction below the bumper-face support member 18, and the stay 40 connecting the bumper-face support member 18 and the bumper beam 12 in the vertical direction, wherein the stay 40 has the deformation promotion portion (the first bending portion 43) configured to be bent so as to promote deformation of the stay 40 when the collision load is downwardly inputted to the bumper-face support member 18 as shown in FIGS. 5 and 6.

According to this structure, the support rigidity and the assembling accuracy of the bumper face 3 in the normal state and the pedestrian's protection performance in the vehicle frontal collision can be compatibly improved even if the vehicle has the high vehicle-height.

Specifically, the downward load is inputted to the bumper-face support member 18 even in the normal state because of each weight of the bumper face 3 and the bumper-face support member 18, a pressing-down force by a person's hand applied to the bonnet 2 for closing the bonnet 2, or the like.

Herein, since the front end portion of the bonnet is generally located at the level of the pedestrian's thigh portion in the vehicle having the high vehicle-height, there exists a structure in which the front end portion of the bonnet is retreated from a foremost portion of the vehicle in order to reduce an influence on a knee's ligament of the pedestrian in the vehicle collision like the vehicle of the present invention (see FIG. 6).

Thereby, this vehicle is configured such that the vehicle-body member, such as the shroud member 16 or the shroud upper panel 15 which are provided with the latch as a lock device of the bonnet 2, is retreated together width the bonnet's front end portion.

Accordingly, the length, in the vehicle longitudinal length, between the bumper-face support member 18 supporting the bumper face 3 and the vehicle-body member (15, 17), such as the shroud upper panel 15 supporting the bumper-face support member 18 in the cantilever shape from behind becomes long. Therefore, in particular, in the vehicle having the high vehicle-height, when the above-described downward load is inputted to the bumper-face support member 18, there is a concern that a load applied to the brackets 20, 30 connecting the bumper-face support member 18 and the vehicle-body member (15, 17) in the vehicle longitudinal direction may become improperly large.

However, according to the above-described structure, by connecting the bumper-face support member 18 and the bumper beam 12 with the stay 40 in the vertical direction, the stay 40 is stretched against the downward load inputted to the bumper-face support member 18 in the normal state as described above, so that the bumper-face support member 18 is suppressed from being deformed downwardly. Consequently, the support rigidity and the assembling accuracy of the bumper face 3 in the normal state can be improved.

Meanwhile, if the vehicle-height of the vehicle is higher, an input point of the collision load inputted to the upper face of the vehicle front portion from above close moves more forwardly in a case where the collision object hits against the vehicle from the front side. Herein, in the structure in which there is provided the stay supporting the bumper face 3 positioned at the upper face of the vehicle's foremost portion from just below as described above, the vehicle-body front portion which becomes the load input point of the collision object from above becomes so hard, so that there is a concern that reduction of the damage degree of the collision object may become difficult.

However, according to the above-described structure, since the deformation promotion portion (the first bending portion 43) of the stay 40 is bent and deformed in a case where the downward collision load is inputted to the bumper-face support member 18, the damage degree of the collision object can be reduced, so that the pedestrian's protection performance in the vehicle collision can be improved.

Thus, according to this structure, the support rigidity and the assembling accuracy of the bumper face 3 in the normal state and the pedestrian's protection performance in the vehicle frontal collision can be compatibly improved even if the vehicle has the high vehicle-height.

In the embodiment of the present invention, as shown in FIGS. 2-6, the bracket (20, 30) comprises the middle bracket 30 (indirect bracket) to fixedly connect the shroud upper panel 15 as the vehicle-body member and the bumper-face support member 18 via the stay 40, and the middle bracket 30 is configured to fixedly connect the shroud upper panel 15 and the stay 40 therebetween.

According to this structure, since the stay 40 can support the bumper-face support member 18 in a state where the stay 40 is supported by the middle bracket 3, the support rigidity and the assembling accuracy of the bumper face 3 in the normal state can be further improved.

In the embodiment of the present invention, as shown in FIGS. 5 and 6, the stay 40 comprises the first extension portion 42 extending downwardly and the second extension portion 44 extending obliquely downwardly-and-forwardly from the lower end of the first extension portion 42 via the first bending portion 43 (bending portion) as the deformation promotion portion.

According to this structure, since when the downward collision load is inputted to the bumper-face support member 18, the load transmitted to the stay 40 from the bumper-face support member 18 focuses on the first bending portion 43, the stay 40 can be bent and deformed securely by making the first bending portion 43 be a bending causing point, and the deformation promotion portion can be constituted with a simple structure in which a part of the stay 40 is formed in a bending shape.

In the embodiment of the present invention, as shown in FIGS. 5 and 6, the stay 40 is connected to the bumper-face support member 18 (see FIGS. 4 and 6) via the gusset 50, and the gusset 50 comprises the lateral plate portion 51 extending in the vehicle longitudinal direction and supporting the bumper-face support member 18 and the vertical plate portion 52 downwardly extending from the lateral plate portion 51 and fixed to a point of the stay 40 which is located above the first bending portion 43.

According to this structure, when the downward collision load is inputted to the bumper-face support member 18, this collision load can be firmly received by the lateral plate portion 51 and also efficiently transmitted to the lower-located first bending portion 43 of the stay 40 via the vertical plate portion 52.

That is, the stay 40 can be prevented from being improperly deformed at any other point than the first bending portion 43, which may be caused by some unexpected bending moment applied to the stay 40 during the above-described load's transmission to the stay 40 from the bumper-face support member 18. Thus, the stay 40 can be securely deformed at a target point (i.e., the first bending promotion portion 43).

Further, since an overlapping part of the stay 40 and the vertical plate portion 52 is made strong by fixing the stay 40 and the vertical plate portion 52, when the downward collision load is inputted to the bumper-face support member 18, this load can be efficiently transmitted to the portions below the stay 40 and also the upper portion of the stay 40 can be securely prevented from being bent (broken).

Additionally, by connecting the stay 40 to the bumper-face support member 18 via the gusset 50, the assembling level (height) of the bumper-face support member 18 can be adjusted precisely and easily by using the gusset 50 differently from a case where the stay 40 is directly connected to the bumper-face support member 18.

In the embodiment of the present invention, as shown in FIGS. 5 and 6, the vertical plate portion 52 extends downwardly from the rear end of the lateral plate portion 51, and the lateral plate portion 51 supports the bumper-face support member 18 (see FIGS. 4 and 6) in front of the vertical plate portion 52.

According to this structure, since the vertical plate portion 52 extends downwardly from the rear end of the lateral plate portion 51, the lateral plate portion 51 is configured to support the bumper-face support member 18 from the forward side of the vertical plate portion 52. Thereby, the bumper-face support member 18 can be supported by the lateral plate portion 51 at a properly front-side vehicle's end position without arranging the stay 40 itself at the forward position, and the length, in the vehicle longitudinal direction, of the middle bracket 30 can be made as short as possible.

Accordingly, the length, in the vehicle longitudinal direction, of the middle bracket 30 can be suppressed, allowing a situation where the distance, in the vehicle longitudinal direction, between the bumper face 3 and the shroud upper panel 15 becomes long according to the retreat of the front end 2f of the bonnet 2, so that the support rigidity and the assembling accuracy of the bumper face 3 in the normal state can be further improved.

In the embodiment of the present invention, as shown in FIGS. 5 and 6, the front flange portion 32 (front end) of the middle bracket 30 extending in the vehicle longitudinal direction is attached to the point of the stay 40 which is located above the first bending portion 43 in the vertical direction.

According to this structure, even in the structure in which the bumper-face support member 18 is arranged in front of the shroud upper panel 15 as the vehicle-body member, the support rigidity and the assembling accuracy of the bumper face 3 in the normal state can be improved. Further, when the downward collision load is inputted to the bumper-face support member 18, it can be extremely suppressed that an auxiliary component, such as the radiator 19, is damaged by the stay.

Specifically, in the structure in which the bumper-face support member 18 is supported in the cultivate shape from the front side of the vertical plate portion 52, when the downward collision load is inputted to the bumper-face support member 18, a bending stress to make the first extension portion 42 (the portion located above the first bending portion 43) of the stay 40 be bent forwardly (lean forwardly) together with the lateral plate portion 51 is applied to the first bending portion 43.

Thereby, the stay 40 tends to be bent easily by the downward load input even in the normal state at the first bending portion 43, which is not preferable.

Further, if the first extension portion 42 of the stay 40 is bent forwardly (leans forwardly), the first bending portion 43 is bent such that it protrudes rearwardly, so that the auxiliary component, such as the radiator 19, may be damaged by the stay 40, which is not preferable either.

Herein, according to the present embodiment, since the front flange portion 32 of the middle bracket 30 extending in the vehicle longitudinal direction is attached to the point of the stay 40 which is located above the first bending portion 43, it can be suppressed that the upper portion of the stay 40 is unexpectedly deformed in a forwardly-leaning shape when the downward load is inputted to the bumper-face support member 18 in the normal state, so that the support rigidity and the assembling accuracy of the bumper face 3 in the normal state can be improved.

Meanwhile, since the stay 40 can be securely deformed at the first bending portion 43 without making the upper portion of the stay 40 be deformed in the forwardly-leaning shape when the downward load is inputted to the bumper-face support member 18 in the normal state, the auxiliary component, such as the radiator 19, can be suppressed from being damaged as much as possible.

In the embodiment of the present invention, as shown in FIGS. 5 and 6, the attachment position of the middle bracket 30 to the stay 40 is located below the lateral plate portion 15.

According to this structure, the upper portion of the stay 40 can be supported by the middle bracket 30 at a lower position which is closer to the first bending portion 43 than the lateral plate portion 51 so that it can be prevented that the first bending portion 43 as the deformation promotion portion of the stay 40 is bent and thereby the first bending portion 43 moves toward a side of the auxiliary component, such as the radiator 19 (rearwardly) in a vehicle light collision. Thereby, a lower end of the first extension portion 42 is prevented from protruding downwardly in the vehicle light collision, so that it can be suppressed that the auxiliary component, such as the radiator 19, is damaged by the stay 40.

In the embodiment of the present invention, as shown in FIGS. 5-7, the stay 40 has the stay-reinforcing ridgelines 144, 145 which extends in the extension direction of the stay 40, continuously over a range of the first bending portion 43 and the gusset-reinforcing ridgeline 153 which extends, in the extension direction of the gusset 50, continuously over a range of the vertical plate portion 52 and the lateral plate portion 51, and the stay-reinforcing ridgeline 144 and the gusset-reinforcing ridgeline 153 are located substantially at the same position in the vehicle width direction in a state where the vertical plate portion 52 is fixed to the stay 40 as shown in FIG. 7.

According to this structure, the stay 40 is prevented by the stay-reinforcing ridgelines 144, 145 from being deformed unexpectedly at the first bending portion 43 by the downward load in the normal state, so that the bending rigidity can be properly secured.

Further, when the downward collision load is inputted to the bumper-face support member 18, this load can be efficiently transmitted to the lateral plate 51, the vertical plate portion 52, and the stay 40 in order along the ridgelines (153, 144). That is, when the downward collision load is inputted to the bumper-face support member 18, the impact load is efficiently transmitted between different members, such as from the lateral plate portion 51 to the vertical plate portion 52, or from the vertical plate portion 52 to the stay 40, so that the stay 40 can be securely deformed at the first bending portion 43.

The present invention is not limited to the above-described embodiment, but can be materialized by various modifications.

What is claimed is:

1. A front structure of a vehicle, comprising:
   a vehicle-body member provided at a vehicle-body front portion;
   a bumper-face support member extending in a vehicle width direction in front of the vehicle-body member and having an attachment portion where a bumper face is attached;
   plural brackets fixedly connecting the vehicle-body member and the bumper-face support member;
   a bumper beam extending in the vehicle width direction below the bumper-face support member; and
   a stay connecting the bumper-face support member and the bumper beam in a vertical direction,
   wherein said stay has a deformation promotion portion configured to be bent so as to promote deformation of the stay when a collision load is downwardly inputted to said bumper-face support member, and
   said bracket comprises an indirect bracket to fixedly connect a shroud upper as said vehicle-body member and said bumper-face support member via said stay, and said indirect bracket is configured to fixedly connect said shroud upper and said stay therebetween.

2. The front structure of the vehicle of claim 1, wherein said stay comprises a first extension portion extending downwardly and a second extension portion extending obliquely downwardly-and-forwardly from a lower end of said first extension portion via a bending portion as said deformation promotion portion.

3. The front structure of the vehicle of claim 2, wherein said stay is connected to said bumper-face support member via a gusset, and said gusset comprises a lateral plate portion extending in a vehicle longitudinal direction and supporting said bumper-face support member and a vertical plate portion downwardly extending from said lateral plate portion and fixed to a point of said stay which is located above said deformation promotion portion.

4. The front structure of the vehicle of claim 3, wherein said vertical plate portion extends downwardly from a rear end of said lateral plate portion, and said lateral plate portion supports said bumper-face support member in front of said vertical plate portion.

5. The front structure of the vehicle of claim 4, wherein a front end of said indirect bracket extending in the vehicle longitudinal direction is attached to a point of said stay which is located above said deformation promotion portion in the vertical direction.

6. The front structure of the vehicle of claim 5, wherein an attachment position of said indirect bracket to said stay is located below said lateral plate portion.

7. The front structure of the vehicle of claim 6, wherein said stay has a stay-reinforcing ridgeline which extends, in an extension direction of the stay, continuously over a range of said deformation promotion portion and a gusset-reinforcing ridgeline which extends, in an extension direction of said gusset, continuously over a range of said vertical plate portion and said lateral plate portion, and said stay-reinforcing ridgeline and said gusset-reinforcing ridgeline are located substantially at the same position in the vehicle width direction in a state where the vertical plate portion is fixed to the stay.

8. The front structure of the vehicle of claim 1, wherein said stay is connected to said bumper-face support member via a gusset, and said gusset comprises a lateral plate portion extending in a vehicle longitudinal direction and supporting said bumper-face support member and a vertical plate portion downwardly extending from said lateral plate portion and fixed to a point of said stay which is located above said deformation promotion portion.

\* \* \* \* \*